(12) United States Patent
Sporn

(10) Patent No.: US 6,341,829 B1
(45) Date of Patent: Jan. 29, 2002

(54) PET LOCKER

(76) Inventor: Joseph S. Sporn, 274 W. 86th St., New York, NY (US) 10024

( * ) Notice: Subject to any disclaimer, the term of this patent is extended or adjusted under 35 U.S.C. 154(b) by 0 days.

(21) Appl. No.: 09/483,613

(22) Filed: Jan. 14, 2000

(51) Int. Cl.$^7$ .............................................. A47B 83/00
(52) U.S. Cl. ...................................... 312/237; 312/280
(58) Field of Search ................................ 312/280, 245, 312/34.8, 237

(56) References Cited

U.S. PATENT DOCUMENTS

| | | | | |
|---|---|---|---|---|
| 170,288 A | * | 11/1875 | Miller | 312/280 |
| 1,463,511 A | * | 7/1923 | Lane | 312/280 |
| 1,877,514 A | * | 9/1932 | Katzman | 312/280 |
| 5,141,300 A | * | 8/1992 | Ciesla | 312/245 |
| 5,447,227 A | * | 9/1995 | Koseberg | 206/233 |
| 6,129,096 A | * | 10/2000 | Johnson | 134/34 |
| 6,257,473 B1 | * | 7/2001 | 'Ringelstetter | 224/675 |

* cited by examiner

Primary Examiner—Peter M. Cuomo
Assistant Examiner—Jerry Anderson
(74) Attorney, Agent, or Firm—Hopgood, Calimafde, Judlowe & Mondolino LLP

(57) ABSTRACT

A wall-mountable locker to store dog care articles as well as to provide a dispenser for bags to package dog poop, and pegs on which to hang the dog's collar and a leash whereby articles required to care for a particular dog are compactly stored on and in the locker. The locker includes a backboard on which is mounted a cabinet that is compartmentalized to create a group of cubicles, each of which is dimensioned to accommodate a respective article. Supported on the backboard below the cabinet is a dispenser carrying a roll of plastic poop bags and below the dispenser are the pegs.

8 Claims, 3 Drawing Sheets

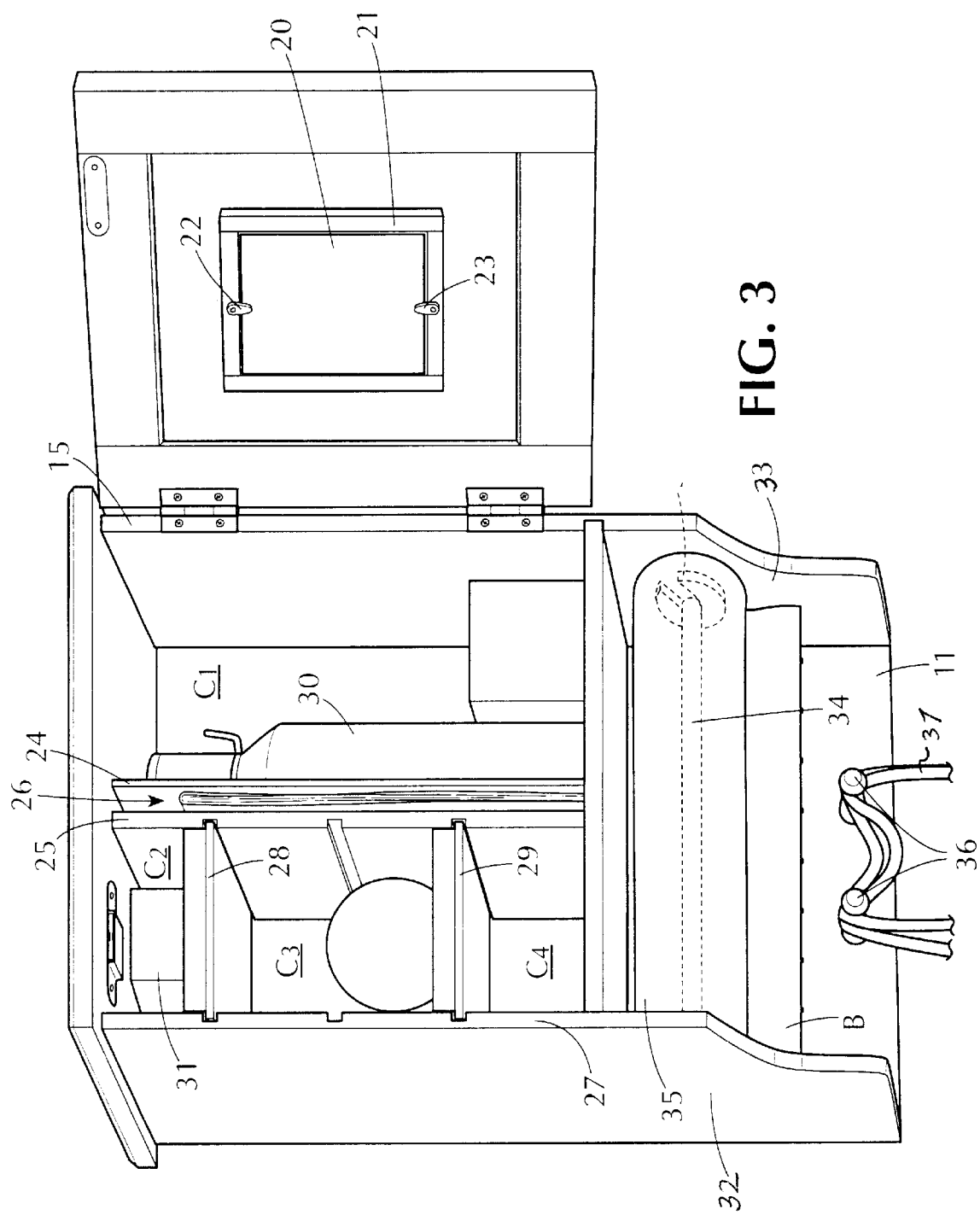

PET LOCKER

BACKGROUND OF INVENTION

1. Field of Invention

This invention relates generally to lockers for storing various articles, and in particular to a locker adapted to store articles specifically required for the care of a pet dog.

2. Status of Prior Art

My prior U.S. Pat. No. 4,964,369 discloses a dog harness and a leash therefor adapted to discourage a dog from pulling on the leash, thereby giving an individual walking the dog better control of the dog.

In most cites in the United States a dog is not permitted to freely roam the streets, for the dog must be leashed and thereby under the control of the individual holding the leash. And in the city of New York, while a dog is permitted to defecate in the streets, by law the walker of the dog must pick up and package the dog droppings or "poop" so that it can be properly disposed of and not foul the streets.

The common practice for packaging poop is to use for this purpose plastic film bags of the type currently used for storing food.

Most families who dwell in New York City live in apartment houses, there being nearly as many dogs in these houses as there are families. An apartment dweller must walk his pet at least once a day in the streets. Because of this and also because the dog is housed in the apartment, the apartment dweller is faced with certain practical difficulties that do not confront a pet owner who lives in a spacious suburban or rural home.

To properly care for the health and appearance of a pet dog is no small task, for required for this purpose are grooming articles, such as a curry comb and brush as well as health care articles, such as a flea and tick shampoo, and medication prescribed by a veterinarian. It is also important that the dog owner maintain a record of the shots administered to the dog by a veterinarian so that the owner knows when it is necessary to return back to the veterinarian for booster shots or other treatment.

Hence an apartment dweller who more often than not lives in cramped quarters, in order to properly care for his pet dog who shares these quarters, must find space in his apartment for storing the various grooming and health care articles that such care entails.

Since it is common for a dog owner to use standard plastic food bags for packaging dog poop, and such bags are usually stored in a kitchen cabinet, when the dog owner needs a poop bag, he then goes into the kitchen to pick one up. However, to store a dog collar and leash which is needed only when the dog is to be taken outdoors, the most convenient place for this purpose is the closet nearest to the door to the apartment. But this closet is often crowded with clothing. As a consequence, when seeking to retrieve the dog collar and leash, the dog owner may have difficulty in finding these articles in the closet.

As to where to put the dog shampoo, medications for the dog and other health care articles, while these can be put in a bathroom cabinet in which the family shampoo and medications are stored, it is not good practice to intermingle dog care articles with family care articles. Still another problem is just where to store the dog grooming articles so that they are easily accessible.

And if the pet dog is provided with an artificial chewing bone, a small ball or other playthings, it is not a good idea to co-mingle these items with the toys of the family children in a common storage space.

Hence a need exists to store compactly in one place in an apartment or wherever else a pet dog is housed, all of the grooming and health care articles required for the care of the dog.

SUMMARY OF THE INVENTION

In view of the foregoing, the main object of this invention is to provide a locker adapted to compactly store in one place all of the articles necessary to care for a pet dog, the locker providing ready access to these articles.

A significant advantage of a locker in accordance with the invention is that it obviates the need to store the articles a dog owner requires for the care of his dog in scattered places and for the dog owner to remember where a particular article is stored when the need arises to retrieve it.

More particularly, an object of the invention is to provide a locker of the above type which is wall-mountable and occupies a relatively small space on the wall, so that even in a small apartment, or other residencial space can be found to mount the dog locker.

Also an object of this invention is to provide a locker which includes a slot for receiving and storing health treatment sheets on which are recorded the shots administered to the pet dog and other treatment data.

Yet another object of the invention is to provide a locker having a dispenser which carries a roll of plastic film poop bags whereby to obtain a bag, one has only to tear it off the roll.

Briefly stated, these objects are attained by a wall-mountable locker adapted to store dog care articles as well as to provide a dispenser for bags to package dog poop, and pegs on which to hang the dog's collar and a leash therefor whereby whatever one requires to care for a particular dog is compactly stored by the locker.

The locker includes a backboard on which is mounted a cabinet that is compartmentalized to create a group of cubicles, each of which is dimensioned to accommodate a respective article. Supported on the backboard below the cabinet is a dispenser carrying a roll of plastic poop bags, and below the dispenser are the pegs.

BRIEF DESCRIPTION OF DRAWING

For a better understanding of the invention, as well as further features thereof, reference is made to the detailed description thereof to be read in connection with the annexed drawings wherein:

FIG. 3 illustrates the interior of the locker with the door open; and

DESCRIPTION OF INVENTION

Figure 1:
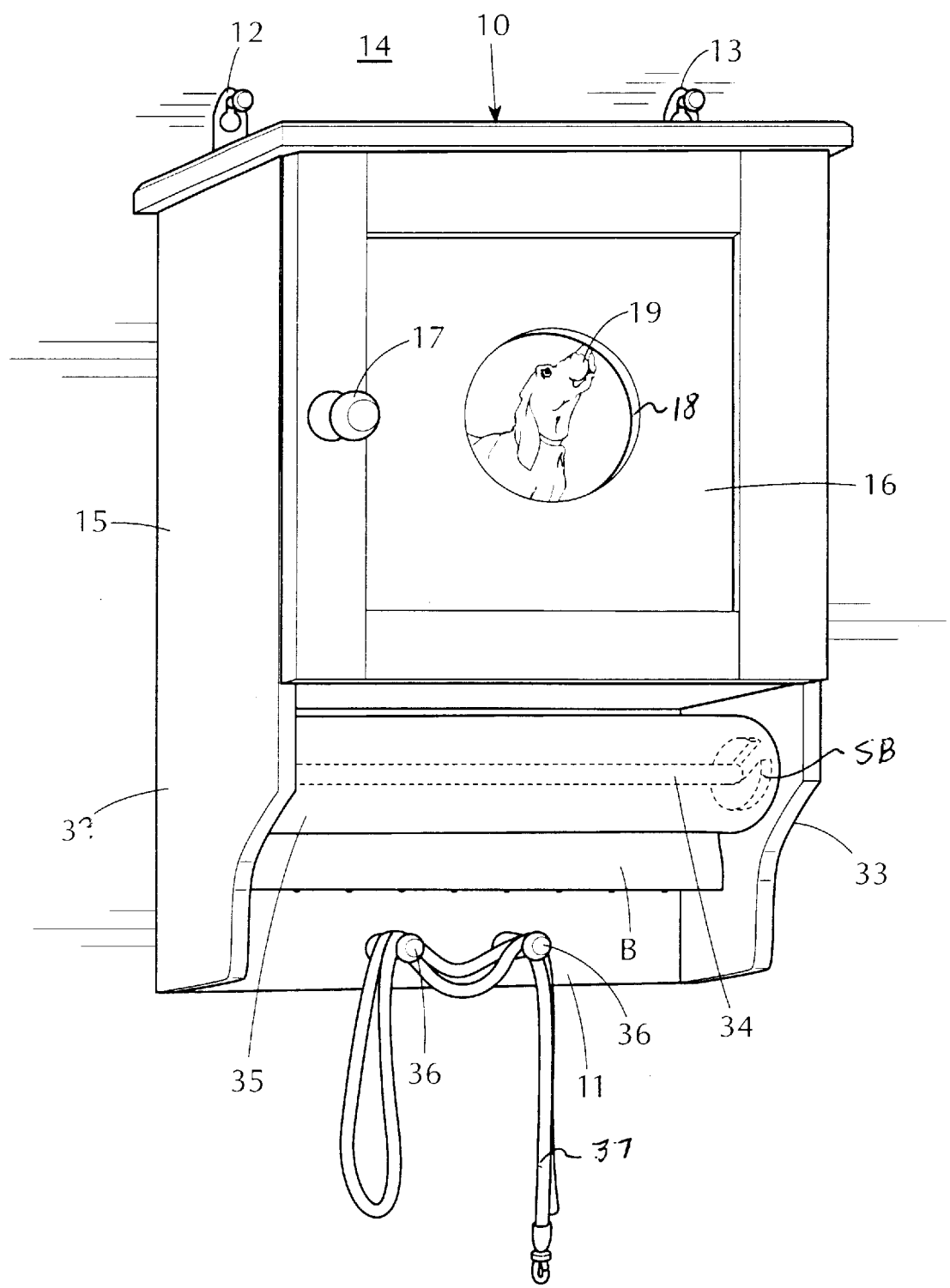
FIG. 1 in a perspective view of a dog locker in accordance with the invention.
Figure 2:
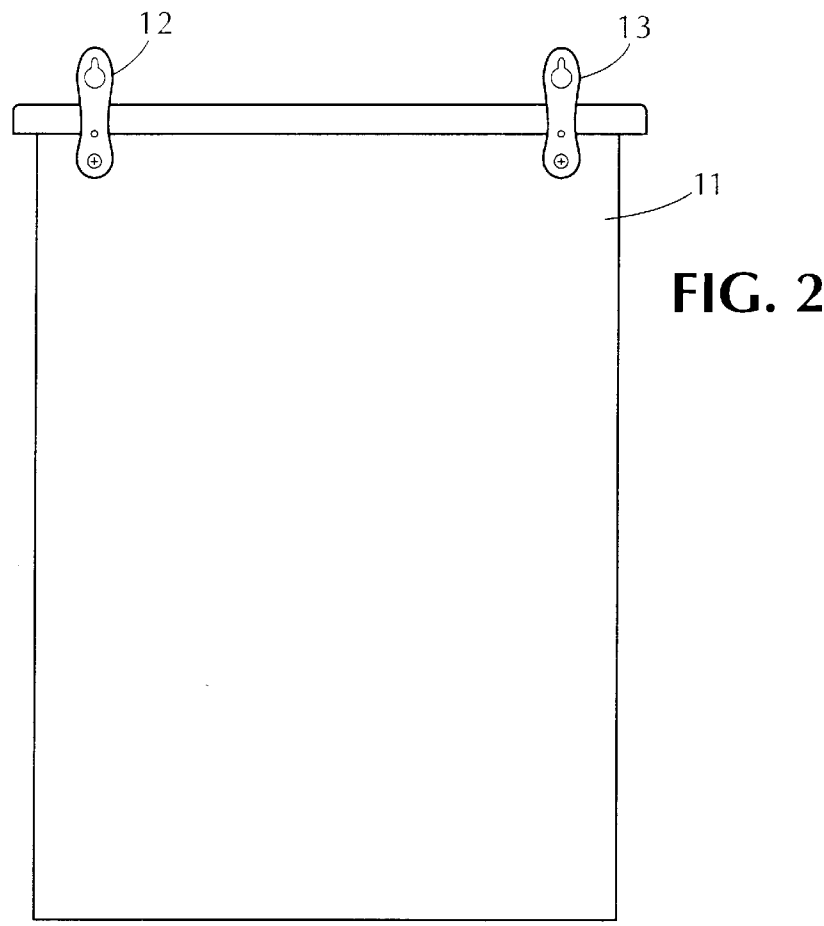
FIG. 2 is a rear view of the locker.
Figure 4:
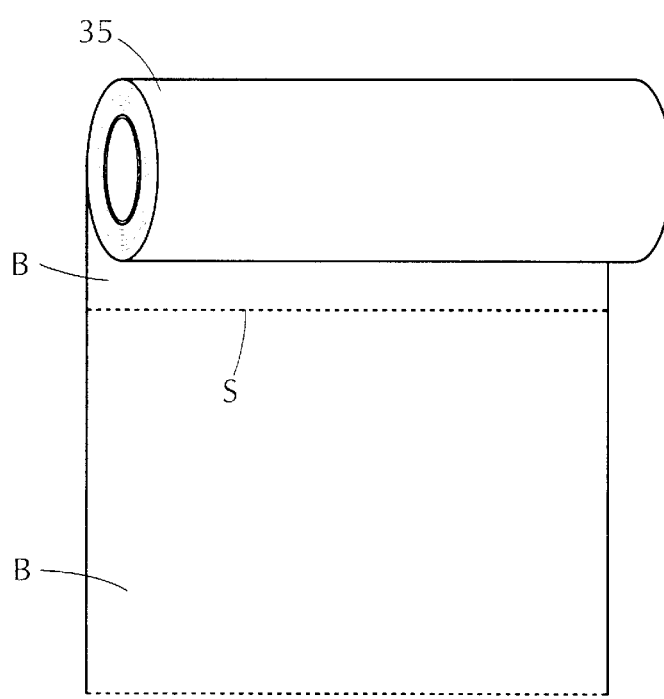
FIG. 4 shows the roll of plastic film poop bags mounted on the spindle of the bag dispenser.

Referring now to FIGS. 1 and 2, shown in these figures is a wall-mountable dog's locker 10 in accordance with the invention which is preferably fabricated of wood. In practice however, the locker may be molded of synthetic plastic material of high strength, such as polypropylene.

The locker includes a rectangular backboard 11 having metal hanger tabs 12 and 13 attached to the upper end of the board. These tabs make it possible to suspend the locker from a wall 14 in the apartment or other quarters where the dog is housed.

Just where the locker is to be installed is for the dog owner to decide. While the locker is best located at a place that is most convenient to its user, the user must take into account where space is available in his residence.

Mounted on backboard 11 is a rectangular cabinet 15 having a hinged door 16 opened by a knob 17. Cut into the center of door 16 is a circular open window 18 behind which a picture 19 of the pet dog to which the locker is dedicated. Thus the owner of the dog can take a Polaroid picture of his pet and then cut it to fit behind the window.

To support picture 19, it is sandwiched between a front rectangular clear plastic plate and a rectangular back plate 20. This sandwich fits into a rectangular frame 21, as shown in FIG. 3, attached to the rear side of door 16, and is held therein by wood fingers 22 and 23 nailed to the upper and lower branches of the frame. To remove the sandwich from the frame in order to replace the pet picture therein, one has only to turn the fingers which are pivoted on nails to a horizontal position in line with the branches.

Cabinet 15 is compartmentalized, as shown in FIG. 3, to create a group of cubicles for storing a dog care articles required by the pet dog. This compartmentalization is effected by a partition panel 24 that divides the interior of the cabinet in half. Parallel to partitional panel 24 is a wall panel 25 to define a narrow vertical slot 26. Insertable in horizontal slide grooves G cut in wall panel 25 and in corresponding grooves cut in side panel 27 are wood shelves 28 and 29. The largest cubicle C can be used to store a flea and tick dog shampoo 30 and other relatively tall dog care articles. The three relatively small cubicles $C_2$, $C_3$ and $C_4$ formed by shelves 28 and 29 can be used to store medication, such as that in box 31, as well as a ball L or other small playthings for the dog.

The narrow cubicle formed by slot 26 is used to store dog treatment record sheets S on which the shots given to the dog are recorded and other treatment data. In practice, the exposed edge of partition 24 may be provided with an arcuate cut out (not shown) to facilitate removal of sheets from the slot.

Mounted below cabinet 15 on the backboard 11 is a poop bag dispenser that includes a pair of brackets 32 and 33, formed by the contoured lower side sections of the locker. Each bracket has a slotted bearing SB mounted on its inner wall to support a spindle 34 that bridges the brackets.

Mounted on spindle 34 is a roll 35 of poop bags B, the bags being formed of transparent synthetic plastic film material. Apart from its smaller dimensions which are appropriate to the packaging of dog poop, the poop bags are similar to the roll of tear-off plastic bags found in supermarkets for packaging fruit and other food products purchased at the market. Thus the roll is formed of a continuous broad plastic band that is transversely scored at equispaced positions along the band by score lines S, making it possible to tear off from the roll an individual bag B.

Mounted on backboard 11 below the bag dispenser are a pair of pegs 36 from which are hangable the collar or harness 37 for the dog and the dog leash.

It is to be understood that the compartmentalization of the cabinet interior, as shown in FIG. 3, is by way of example, and that in practice partitioning of the interior may be such as to provide a different number of cubicles of varying dimensions.

Thus with a wall-mountable locker in accordance with the invention, the user thereof is able to compactly store in one place in his apartment or wherever else his pet dog is housed, all of the articles he needs to take care of the dog, so that whenever he requires a particular article he has ready access thereto.

While there has been shown and described a preferred embodiment of a dog locker, it will be appreciated that many changes and modifications may be made therein without, however, departing from the essential spirit thereof.

I claim:

1. A pet locker for storing pet care products, comprising:

a backboard mountable on a wall having an upper portion and a lower portion;

a cabinet supported on said upper portion of said backboard having a front section including an interior provided with a plurality of cubicles, each of said cubicles for storage of at least one pet care article, at least one toy, or at least one pet care article and at least one toy;

a roll of synthetic plastic film bags having a continuous band scored at equally spaced positions to define individual bags;

a dispenser mounted on said lower portion of said backboard supporting said roll of synthetic plastic film bags, so as to allow for removal of individual bags and replacement of said roll of synthetic plastic film bags entirely;

a dog leash having a first end and a second end, wherein said first end includes a loop for holding said dog leash, and said second end includes an attachment for attaching said dog leash to a dog collar; and at least one support protrusion mounted on said backboard, said cabinet, or said backboard and said cabinet supporting said dog leash, wherein said support protrusion is selected from a group consisting of a peg, hook, pin or other attachment.

2. A locker as set forth in claim 1, in which one of the cubicles is dimensioned to accommodate a dog grooming article.

3. A locker as set forth in claim 1, in which the front section is provided with a hinged door to provide access to the interior of the cabinet.

4. A locker as set forth in claim 3, in which the door has an open window behind which the picture is displayed.

5. A locker as set forth in claim 4, in which the picture is positioned between a transparent plate and an opaque plate, wherein the picture, the transparent plate and the opaque plate are fitted into a frame secured to the rear of the door and surrounding the window.

6. A locker as set forth in claim 1, further including pegs mounted on the backboard below the dispenser for hanging a collar and a leash.

7. A locker as set forth in claim 1, in which one of the cubicles is in the form of a slot for housing medical records.

8. A locker as set forth in claim 1, in which one of the cubicles is dimensioned to accommodate a flea and tick shampoo for a dog.

* * * * *